US006982988B2

(12) United States Patent
Rupp et al.

(10) Patent No.: US 6,982,988 B2
(45) Date of Patent: Jan. 3, 2006

(54) PROGRAMMABLE FRAME SPLITTER

(75) Inventors: Michael E Rupp, Amherst, NY (US); Ronald D Olsen, Lake View, NY (US); Jon C Melnik, Alden, NY (US)

(73) Assignee: Intel Corporation, Santa Clara, CA (US)

( * ) Notice: Subject to any disclaimer, the term of this patent is extended or adjusted under 35 U.S.C. 154(b) by 815 days.

(21) Appl. No.: 10/044,766

(22) Filed: Jan. 10, 2002

(65) Prior Publication Data

US 2003/0128721 A1    Jul. 10, 2003

(51) Int. Cl.
*H04J 3/16*    (2006.01)
(52) U.S. Cl. ..................................... 370/470; 370/474
(58) Field of Classification Search ................ 370/349, 370/366, 389, 401, 402, 470, 471, 47, 395.62, 370/474, 476, 487, 490, 506
See application file for complete search history.

(56) References Cited

U.S. PATENT DOCUMENTS 6,128,317 A * 10/2000 Mackre ...................... 370/479

\* cited by examiner

*Primary Examiner*—Brenda Pham
(74) *Attorney, Agent, or Firm*—Pillsbury Winthrop Shaw Pittman LLP

(57) ABSTRACT

A programmable frame splitter includes a plurality of programmable routers connected to a communication line. The routers contain logic to specify which bits of a frame of serial data are passed to an output of each of the routers. A control unit is provided having logic to control loading and startup of the routers. A field processing unit is provided to receive a bit-clock-out signal from each of the routers and serial data from the communication line. The field processing unit splits the frame of serial data into component fields and performs processing on the field.

27 Claims, 5 Drawing Sheets

PROGRAMMABLE FRAME SPLITTER

BACKGROUND OF THE INVENTION

1. Field of the Invention

The present invention generally relates to digital telephony. More particularly, the present invention relates to splitting frames of a serial data stream into component fields using a programmable frame splitter.

2. Discussion of the Related Art

Digital telephony data is transmitted, serially, between a PBX (Private Branch Exchange) and a digital phone set. A PBX is a multi-line switching network that is typically located on the premises of a business. The switching network establishes connections between two PBX-supported telephones or between a PBX-supported telephone and an off-premises telephone. PBX/digital phone set transmission schemes are typically proprietary.

A common transmission scheme uses short frames of information on a periodic basis. Within each frame there is a predetermined order of fields. One of the key elements of implementing a telephony protocol stack is the ability to split the frame into component fields. While the problem is easily solved by software using masking and shift operations, the data transmission rate and number of connections that each microprocessor must support makes the solution computationally intensive. As a further complication, telephony equipment is very cost sensitive. Therefore, a microprocessor with the necessary processing power is prohibitively expensive The network most commonly used to support digital phones is the Integrated Services Digital Network (ISDN). With ISDN, voice and data are carried by bearer channels (B channels) occupying a bandwidth of 64 Kbps (Kilobits per second). A data channel (D channel) handles signaling at 16 Kbps or 64 Kbps, depending on the service type. ISDN includes at least two B-channels carrying user data and a D-channel that primarily carries signaling data. The Basic Rate Interface (BRI) has two B-channels and a single D-channel, possesses a bandwidth of 144 Kbps, and is sometimes referred to as a 2B+D interface to the ISDN.

The signaling capabilities of an ISDN are significantly superior to the current public network supporting analog phones. Typically, key phone systems and other private exchanges are connected to a public switched telephone network (PSTN) to provide voice communication service. In contrast to the conventional telephone network, an ISDN offers a variety of features including multimedia communication service such as voice, high-speed data and image communication services, and other additional non-voice communication services via network interfaces on the basis of digitization of the telephone network.

A PBX transmits to a digital phone set using proprietary protocols that typically follow many of the same principles as the ISDN protocol. Therefore, a discussion of the ISDN data transmission scheme serves as a basis for understanding proprietary PBX/digital phone protocols.

In a U.S., the telephone company provides its BRI customers with a U-interface. The U-interface is a two-wire (single pair) interface from the phone switch. It supports full-duplex data transfer over a single pair of wires, therefore only a single device can be connected to a U-interface. This device is called a Network Termination 1 (NT-1). The NT-1 functions as a frame splitter.

The NT-1 is a relatively simple device that converts the 2-wire U-interface into the 4-wire S/T interface. The S/T interface supports multiple devices (up to 7 devices may be placed on the S/T bus) because, while it is still a full-duplex interface, there is now a pair of wires for receive data, and another pair for transmit data.

Digital telephony data is transmitted to the U-interface. Each U-interface frame is 240 bits long. At the prescribed data rate of 160 kbps, each frame is therefore 1.5 msec long. There are 216 2B+D bits placed in each 1.5-ms basic frame.

The $B_1$- and $B_2$-channels and the D-channel (subrate channels) are multiplexed in a basic frame. A channel occupies an integer number of time slots and is in the same time-slot position in every frame. The $B_1$- and $B_2$-channels and the D-channel may be thought of as component fields. To demultiplex the $B_1$- and $B_2$-channels and the D-channel, it is necessary to split the basic frame into the component fields. For ISDN, this is accomplished by the NT-1 frame splitter.

Frame splitting typically relies on a dedicated hardware implementation to split the frames of the serial data stream into fields. One such implementation is shown in FIG. 1. The inputs into the splitter are: 1) a frame start signal, and 2) a bit clock. The output for each field is an envelope signal that specifies the time of the field. Components that process the field data use 1) a serial data stream, 2) the bit clock, and 3) the field envelope to extract the field's data.

When using a fixed frame splitter, a new hardware design is needed as each protocol stack is implemented. This arrangement results in a proliferation of designs that must be debugged, documented, and maintained. Therefore, there is a need for a programmable frame splitter that does not require a dedicated hardware implementation to split the serial data into component fields.

DETAILED DESCRIPTION

Figure 1:
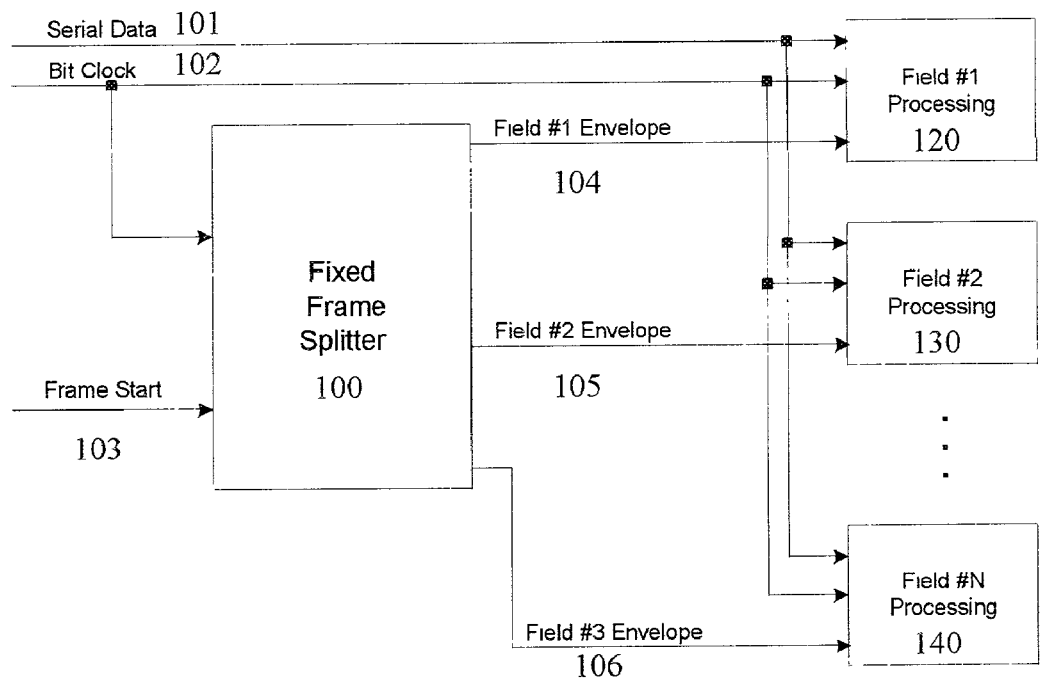
FIG. 1 illustrates a dedicated hardware implementation to split serial data into component fields according to the prior art.
Figure 2:
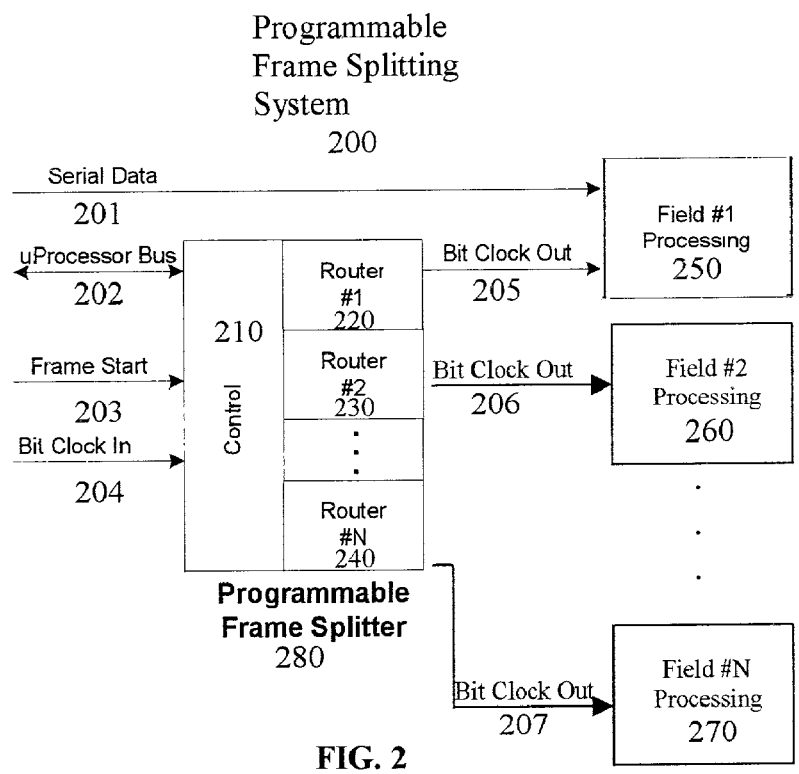
FIG. 2 illustrates a programmable frame splitting system to split serial data into component fields according to an embodiment of the present invention.

FIG. 2 illustrates a programmable frame splitting system 200 according to an embodiment of the present invention. The programmable frame splitting system includes a communication line 201, a programmable frame splitter 280 containing a set of programmable routers 220, 230, 240 with logic that controls the loading and startup of the routers, and field processing units 250, 260, 270.

Each router 220, 230, 240 operates independently and contains Random Access Memory (RAM) that is programmable on a bit-by-bit basis to pass through any combination of frame bits. RAM is considered "random access" because any memory cell may be accessed directly based on an address.

RAM devices fall into two general categories: static or dynamic. Static RAMs hold their contents for as long as power is applied. Dynamic RAMs "forget" their contents after a short period (a few seconds) unless they are refreshed. The refresh circuitry is fairly easy to implement, however, while the memory is being refreshed it can not be accessed. Therefore, static memories are normally used in timing critical applications when the contents of the memory must be available at all times.

Static memories are further divided into two main types: asynchronous or synchronous. For asynchronous memories, an address is presented at the input to the memory and a short time later the data appears at the outputs. Synchronous memories require an additional clock input. All functions of the memory (read and write) occur in relation to the clock. Typically, the rising edge of the clock is used to sample the address lines and the next rising edge presents the data at the outputs.

In addition, static memories can be either single-ported or dual-ported. In a single-port memory there is one input address bus, reading or writing to the memory is controlled by a Read/Write input. Dual-ported memories have a read address bus and a write address bus. One bus is used to read the memory, and the other to write the memory. As an added feature you can read and write the memory simultaneously.

Figure 4:
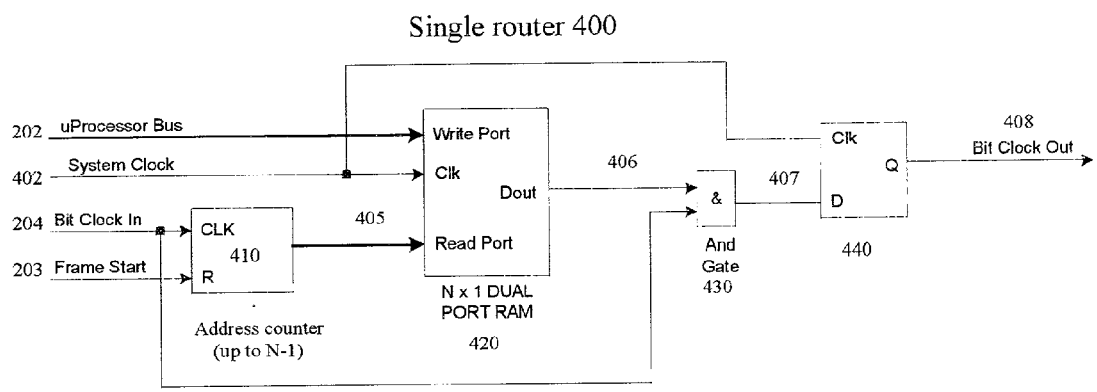
FIG. 4 illustrates a schematic diagram of a single router according to an embodiment of the present invention.

Any of the above types of RAM memory may be used to implement the router. FIG. 4, shows one embodiment using a dual-ported synchronous static RAM. Alternatively, a dual-ported asynchronous static RAM may be used by removing the system clock input 402. A single-ported memory can be used by addition of a control to multiplex the microprocessor's bus and the address counter. By being creative with the refresh cycles a dynamic RAM may be used. In yet another embodiment of the present invention, the RAM may be part of a Field Programmable Gate Array (FPGA).

A field processing unit 250, 260, 270 is a hardware component that extracts a single field and performs some form of processing. For example, a voice field-processing unit converts the digital voice data into an analog signal suitable for a headset. When implementing the programmable frame splitter, one router is allocated for each field processing unit. There are as many field processing units as the particular application requires. The programmable splitter 280 does not know (or care) what the field processing unit does. The programmable splitter 280 blindly passes the field data to the field processing unit.

The programmable splitter 280 does not create frame envelopes, but instead uses a scheme of "gating" the bit clock 204. For example, this gating is achieved by combining the output of the RAM router table Dout 406 (see FIG. 4) with the bit-clock-in signal 204 via an AND gate 430.

Figure 3:
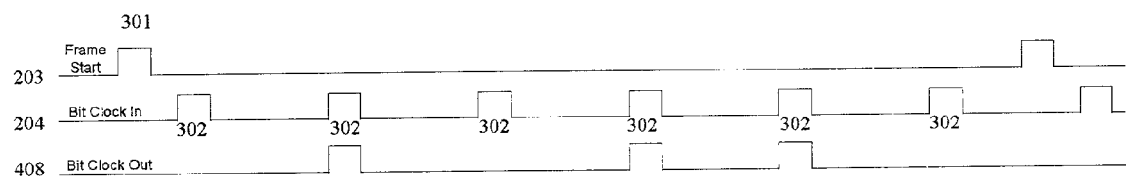
FIG. 3 illustrates a timing diagram of a sample router output according to an embodiment of the present invention.

The timing diagram of FIG. 3 illustrates a hypothetical frame that contains six data bits 302 of the bit-clock-in signal 204. This frame of data is "gated", i.e., combined with the router table output Dout 406 pattern 010110 via the AND gate 430 to produce the bit-clock-out signal 408. The RAM router table contains a row of data with the pattern 010110 that is addressed by the address counter 410 and passed to Dout 406. A hypothetical output of a router is shown by the last line 408 of FIG. 3. This router has been programmed to pass bits 2,4,5 of the frame.

FIG. 4 shows a schematic of a single router 400. Each router 400 contains a table that specifies which bits of a frame should be passed to the router's output 408. The table may be implemented with a N×1 RAM memory 420 and a address counter 410, where N, for example, is the number of bits equal to the largest possible frame size. N may be larger than a given frame size, but may not be smaller. N may be larger because the address counters are reset at the start of each frame. When implementing a splitter, N would be selected to correspond to the largest possible frame size. This implementation allows processing any frame N (or less) bits long. In one embodiment of the present invention, the RAM 420 and address counter 410 are part of a Field Programmable Gate Array (FPGA).

The N×1 RAM contains one column of data N bits long. The address counter contains N addresses that are addressed sequentially using the bit-clock-in 204 and frame start signal 203. Each bit of data in the RAM router table is addressed separately by the address counter 410. The frame start signal 203 is used as a synchronizing signal to tell the router 400 when to restart at the beginning of the RAM data table. This approach is accomplished by using the frame start signal 203 to reset the address counter 410. The frame start signal 203 is typically generated externally.

A system clock 402 is input into the N×1 RAM and the D flip-flop 440 to provide synchronization of the system.

Figure 5:
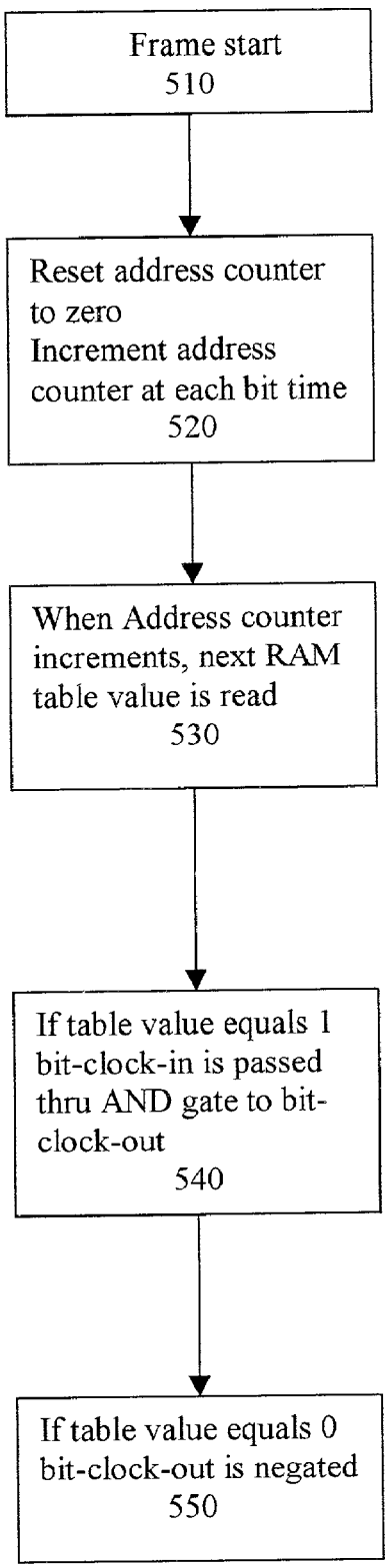
FIG. 5 illustrates a flow chart for implementation of the router table.

FIG. 5 illustrates a flow chart for implementation of the router table. At the start 510 of each frame the frame start bit 301 causes the address counter 410 to reset to zero 520. Then, the address counter 410 increments a new address at each bit time 530. As the address counter 410 increments, an address is provided to the RAM and the next table value is read and passed to Dout 406. When a table value of one is passed as Dout 406 to the AND gate 430, it causes the bit-clock-in signal 204 to be passed 540 as the bit-clock-out signal 408. When a table value of zero is passed as Dout 406 to the AND gate 430 it causes bit-clock-out signal 408 to be zero 550.

In addition to the set of routers 220, 230, 240, the programmable splitter 280 of FIG. 2 includes a control unit 210 that contains control logic that facilitates the writing of data into the various router tables 220, 230, 240, and ensures the orderly startup of each router, 220, 230, 240.

The control unit 210 provides access from the microprocessor to the router memory. Its implementation depends on the router's implementation. If the router 400 uses dual-ported memory the implementation is very simple; some address decoders and a flip-flop that the microprocessor sets to start the routers. If the router uses single-ported memory the implementation is more complex as the unit must control the multiplexing of the microprocessor bus and the address counter. For dynamic memory the control unit will have to contain the refresh circuitry.

The microprocessor bus 202 provides a data path for transmission of data bits from a microprocessor to the software configurable router tables. The data written into the router table selects, on a bit-by-bit basis, which bits of the bit-clock-in signal are passed through the AND gate 430 as the bit-clock-out signal 408. Referring to FIG. 3, to create the required bit-clock-out, the pattern 010110 is written into the router table. Generating the data to write into the router table is the task of the system engineer who uses the splitter component. The splitter component is only a small part of an overall system to process frame data. The system engineer must know the layout of the frame (i.e., the fields), which fields need to be processed and how the fields need to be processed. Once it is determined, the engineer designs (or reuse existing) field-processing units 250, 260, 270. The number of field processing units 250, 260, 270, in turn, determines the number of routers 220, 230, 240, in the splitter. The data written to each router table is generated so that only the field required by the respective field-processing unit 250, 260, 270, is passed through the router 220, 230, 240.

Once the router tables are initialized and the splitter is started, the splitter runs continuously without need for software intervention.

Figure 6:
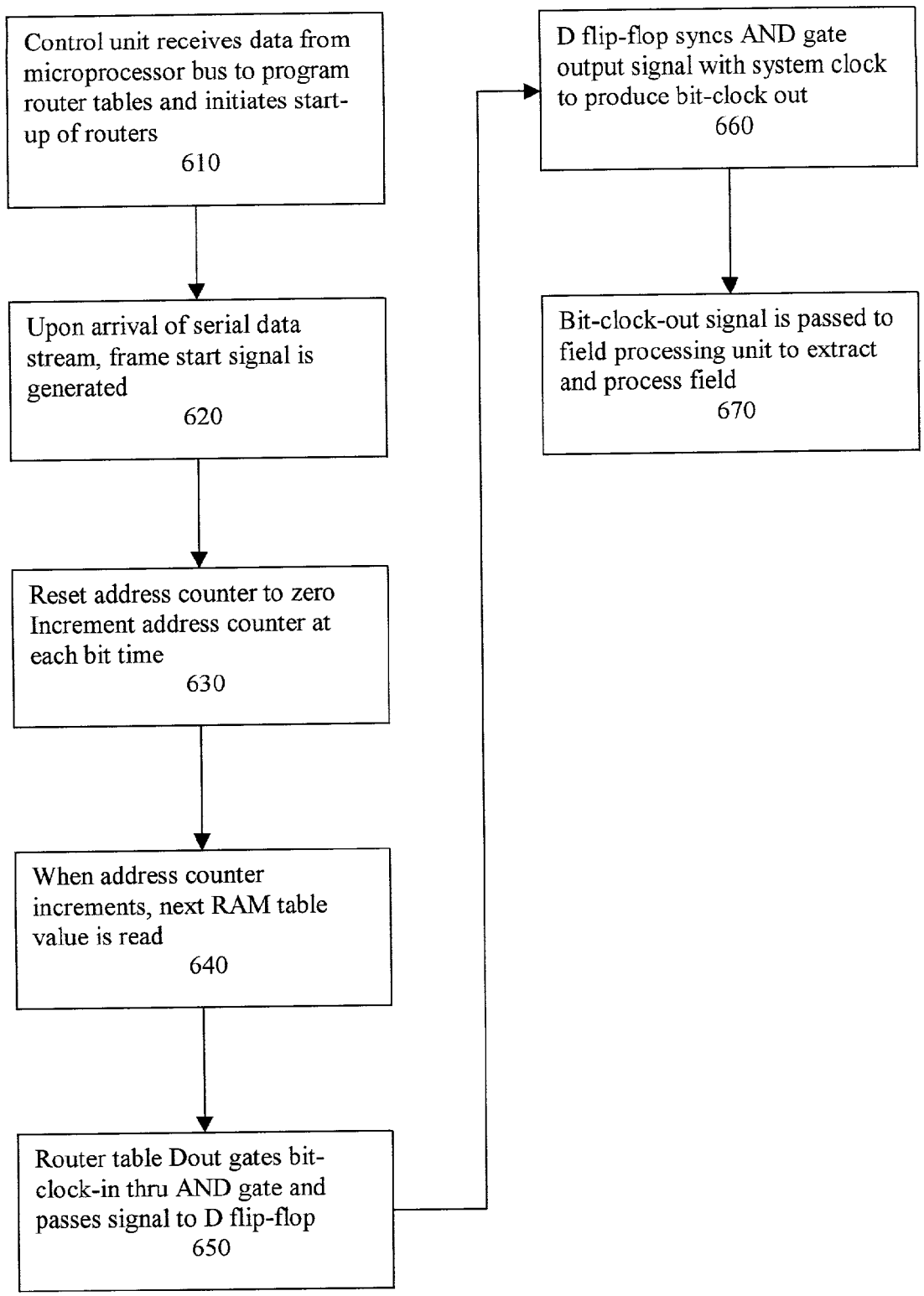
FIG. 6 illustrates a flow chart for implementation of the programmable frame splitting system.

FIG. 6 illustrates a flow chart for the implementation of the programmable frame splitting system 200. A control unit 210 receives 610 data to program the routers 220, 230, 240, from a bus 202 (e.g. lines coupled to a microprocessor) and writes the data to the appropriate software configured router table. The router table is now programmed to extract a particular field from a frame of serial data. The control unit 210 initiates the startup of the appropriate routers 220, 230, 240 in anticipation of the receipt of a serial data stream on the communication line 201. Arrival of serial data stream initiates generation of frame start signal 620. For a particular router, at the start of each frame 203 the address counter 410 is reset 630 to zero and then increments at each bit time. As the address counter 410 increments 640, an address is provided to the RAM 420 and the next table value is read and passed to Dout 406. The output 406 of the RAM router table Dout is combined with the bit-clock-in signal 204 via the AND gate 430 to produce a gating 650 of the bit-clock-in signal. The output of the AND gate 407 is passed to the D flip-flop 440 to provide synchronization 660 with the system clock 402. The bit-clock-out signal is passed to the appropriate field processing unit 250, 260, 270 to extract 670 the field from the serial data stream 201 and provide further processing of the field.

Figure 7:
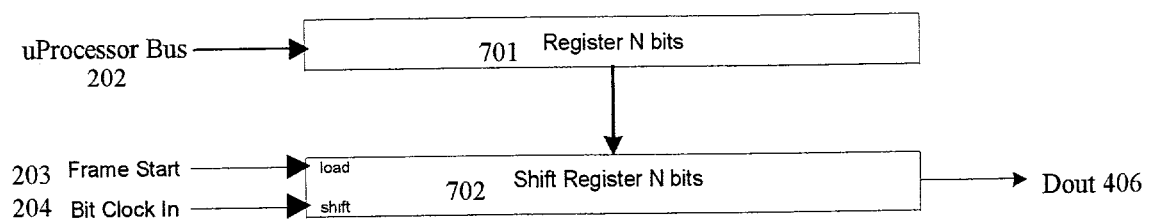
FIG. 7 illustrates memory devices of a single router according to an alternative embodiment of the invention.

FIG. 7 illustrates an alternative embodiment of the invention. A single router 220, 230, 240, contains a router table. The router table may be implemented by a N bit register 701 and a N bit shift register 702. A control unit 210 receives 610 data to program the routers 220, 230, 240, from a bus 202 (e.g. lines coupled to a microprocessor) and writes the data to the appropriate software configured router table. In the alternative embodiment the bus data 202 is written into the N bit register 701. The frame start signal 203 causes the data to be parallel shifted into the N bit shift register 702. The bit-clock-in signal 204 causes the data to be serially shifted out, one bit at a time. The output of the N bit shift register Dout 406 is combined with the bit-clock-in signal 204 via the AND gate 430 to produce a gating 650 of the bit-clock-in signal 204. The output of the AND gate 407 is passed to the D flip-flop 440 to provide synchronization 660 with the system clock 402. The bit-clock-out signal is passed to the appropriate field processing unit 250, 260, 270 to extract 670 the field from the serial data stream 201 and provide further processing of the field.

In summary, the invention is a programmable frame splitter that is flexible enough to handle any frame configuration, including non-continuous fields. By allowing the software to reconfigure the fields, the invention allows for rapid implementation of new protocols and reduces overall hardware costs by introducing a commonality of components.

In prior designs, framing splitting used hardcoded counters and multiplexers requiring new implementations for each protocol. The proposed invention removes the hardcoding and replaces it with software configurable tables. This configuration allows the support of new protocols without the need to design new hardware. A programmable frame splitter, according to the invention, requires only that new tables be devised.

While the description above refers to particular embodiments of the present invention, it will be understood that many modifications may be made without departing from the spirit thereof. The accompanying claims are intended to cover such modifications as would fall within the true scope and spirit of the present invention. The presently disclosed embodiments are therefore to be considered in all respects as illustrative and not restrictive, the scope of the invention being indicated by the appended claims, rather than the foregoing description, and all changes that come within the meaning and range of equivalency of the claims are therefore intended to be embraced therein.

What is claimed is:

1. A programmable frame splitter, comprising:
   a plurality of programmable routers connected to a communication line, each of said routers having logic to control loading and startup of said routers, and logic to specify which bits of a frame of serial data is passed to an output of each of said routers; and
   a plurality of field processing units to receive a bit clock out signal from each of said routers and serial data from the communication line, wherein each of said field processing units splits the frame of serial data into component fields and performs processing on the component fields wherein a control unit receives a bus signal, a frame start signal, and a bit-clock-in signal.

2. The programmable frame splitter according to claim 1, wherein the logic controlling the loading and startup of said routers is contained in the control unit.

3. The programmable frame splitter according to claim 1, wherein the component fields include voice, video, and data.

4. The programmable frame splitter according to claim 1, wherein the logic to specify which bits of the frame of serial data is passed to the output of each of said routers is implemented utilizing at least one memory device.

5. The programmable frame splitter according to claim 4, wherein the logic is implemented with a N×1 memory device and an address counter, where N is a number of bits equal to the largest possible frame size.

6. The programmable frame splitter according to claim 4, wherein the logic is implemented with a N bit register and a N bit shift register, where N is a number of bits equal to the largest possible frame size.

7. A programmable frame splitter, comprising:
   a plurality of programmable routers connected to a communication line, each of said routers containing logic to specify which bits of a frame of serial data is passed to an output of each of said routers;
   a control unit having logic to control loading and startup of said routers; and
   a plurality of field processing units to receive a bit-clock-out signal from each of said routers and serial data from the communication line, each of said field processing units splitting the frame of serial data into component fields and performing processing on the component fields.

8. The programmable frame splitter according to claim 7, wherein the component fields wherein the control unit receives a bus signal, a frame start signal, and a bit-clock-in signal include voice, video and data.

9. The programmable frame splitter according to claim 7, wherein the logic to specify which bits of the frame of serial data is passed to the output of each of said routers is implemented utilizing at least one memory device.

10. The programmable frame splitter according to claim 9, wherein the logic is implemented with a N×1 memory device and an address counter, where N is a number of bits equal to the largest possible frame size.

11. The programmable frame splitter according to claim 9, wherein the logic is implemented with a N bit register and a N bit shift register, where N is a number of bits equal to the largest possible frame size.

12. A program code storage device, comprising:
a machine-readable storage medium; and
machine-readable program code, stored on the machine-readable storage medium, which when executed causes a control unit to receive a bus signal, a frame start signal, and a bit-clock-in signal, write data received from a bus into a router table of a plurality of programmable routers, initiate startup of the plurality of programmable routers, determine which bits of a frame of serial data is passed to an output of each of the routers as a bit-clock-out signal; and
process the bit-clock-out signal from each of said routers and serial data from a communication line, wherein the frame of serial data is split into component fields.

13. The program code storage device according to claim 12, wherein each of the programmable routers operates independently and is programmable on a bit-by-bit basis to pass any combination of frame bits, and each one of the routers contains a table of data, received from a control unit via the bus, said data specifying which bits of the frame is passed to each of the routers' output as the bit-clock-out signal.

14. The program code storage device according to claim 12, wherein the router table is implemented with a N×1 memory device and an address counter, where N is a number of bits equal to a largest possible frame size.

15. The program code storage device according to claim 12, wherein the router table is implemented with a N bit register and a N bit shift register, where N is a number of bits equal to a largest possible frame size.

16. The program code storage device according to claim 12, wherein the router table is implemented utilizing at least one memory device.

17. A programmable frame splitting system, comprising:
a communication line;
a plurality of programmable routers connected to said communication line, wherein each of said routers contains logic to specify which bits of a frame of serial data is passed to an output of each router;
a control unit containing logic to control loading and startup of said routers; and
a plurality of field processing units to receive a bit clock out signal from each of said routers and serial data from the communication line, wherein each of said field processing units splits the frame of serial data into component fields and performs processing on the component fields wherein the control unit receives a bus signal, a frame start signal, and a bit-clock-in signal.

18. The programmable frame splitting system according to claim 17, wherein the component fields include voice, video and data.

19. The programmable frame splitter system according to claim 17, wherein the logic to specify which bits of the frame of serial data is passed to the output of each of said routers is implemented utilizing at least one memory device.

20. The programmable frame splitter according to claim 19, wherein the logic is implemented with a N×1 memory device and an address counter, where N is a number of bits equal to the largest possible frame size.

21. The programmable frame splitter according to claim 19, wherein the logic is implemented with a N bit register and a N bit shift register, where N is a number of bits equal to the largest possible frame size.

22. A method of programmable frame splitting, comprising:
receiving a bus signal, a frame start signal, and a bit-clock-in signal;
writing data received from a bus into a router table of a plurality of programmable routers,
initiating startup of the plurality of programmable routers;
determining which bits of a frame of serial data is passed to an output of each of the routers as a bit-clock-out signal; and
processing the bit-clock-out signal from each of said routers and serial data from the communication line, wherein the frame of serial data is split into component fields and each component field is processed.

23. The method according to claim 22, wherein each of the programmed routers operates independently and is programmable on a bit-by-bit basis to pass any combination of frame bits, wherein each one of the routers contains a table of data, received from a control unit via the bus, said data specifying which bits of the frame is passed to each of the routers' output as the bit-clock-out signal.

24. The method according to claim 23, wherein the table is implemented with a N×1 memory device and an address counter, where N is a number of bits equal to a largest possible frame size.

25. The method according to claim 23, wherein the table is implemented with a N bit register and a N bit shift register, where N is a number of bits equal to a largest possible frame size.

26. The method according to claim 23, wherein the table is implemented utilizing at least one memory device.

27. The method according to claim 22, wherein the determining of which bits of the frame is passed to each of the routers' output as the bit-clock-out signal, at start of each frame an address counter is reset to zero and then increments at each bit time, as the address increments a next table value is read, and a value of one causes the bit-clock-in signal to be passed as the bit-clock-out signal, while a value of zero causes the bit-clocked-out signal to be negated.

* * * * *

UNITED STATES PATENT AND TRADEMARK OFFICE
CERTIFICATE OF CORRECTION

| | |
|---|---|
| PATENT NO. | : 6,982,988 B2 |
| APPLICATION NO. | : 10/044766 |
| DATED | : January 3, 2006 |
| INVENTOR(S) | : Michael E. Rupp, Ronald D. Olsen and Jon C. Melnik |

It is certified that error appears in the above-identified patent and that said Letters Patent is hereby corrected as shown below:

Column 6, line 55, claim 7, insert "wherein the control unit receives a bus signal, a frame start signal, and a bit-clock-in signal." after --fields--

Column 6, line 57, claim 8, delete "wherein the control unit received a bus signal, a frame start signal and a bit-clock-in signal" between --fields-- and --include--

Signed and Sealed this

Twenty-fifth Day of July, 2006

JON W. DUDAS
*Director of the United States Patent and Trademark Office*